US006915274B2

(12) United States Patent
Abhyanker

(10) Patent No.: US 6,915,274 B2
(45) Date of Patent: Jul. 5, 2005

(54) REVERSE LOGISTICS METHOD FOR RECAPTURING VALUE OF USED GOODS OVER INTERNET EXCHANGE PORTALS

(75) Inventor: Raj Abhyanker, Cupertino, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 621 days.

(21) Appl. No.: 09/809,543

(22) Filed: Mar. 14, 2001

(65) Prior Publication Data

US 2002/0133416 A1 Sep. 19, 2002

(51) Int. Cl.[7] .............................................. G06F 17/60
(52) U.S. Cl. ........................................ 705/26; 705/37
(58) Field of Search ............................ 705/26, 27, 37, 705/38, 34

(56) References Cited

U.S. PATENT DOCUMENTS

| 6,260,024 B1 | * | 7/2001 | Shkedy | 705/37 |
| 6,266,651 B1 | * | 7/2001 | Woolston | 705/27 |
| 6,269,343 B1 | * | 7/2001 | Pallakoff | 705/26 |
| 2001/0039497 A1 | * | 11/2001 | Hubbard | 705/1 |

FOREIGN PATENT DOCUMENTS

JP      020012830042 A   *   3/2001   ........... G06F/19/00

OTHER PUBLICATIONS

"Surfing to Spark market for surplus supplies", Susan E Fisher; InfoWorld, Framingham; Mar. 20, 2000.*

"Recycling—The HP Way" —Jan. 25, 2001 —HP website—pp. 1–3.

Renee St. Denis & Steve Skurnac—"Information Technology Product Recycling an OEM/Recycler Collaboration"—pp. 1–3.

Global Support Logistics/Product Recycling Solutions—"HP Product Recycling Solutions Service Offering"—pp. 1–2.

* cited by examiner

Primary Examiner—Wynn W. Coggins
Assistant Examiner—R. E. Rhode, Jr.
(74) Attorney, Agent, or Firm—Lloyd E Dakin, Jr.

(57) ABSTRACT

A reverse logistics method for recapturing value of used goods over one or more internet exchange portals is disclosed. The method of the present invention includes the steps of offering used goods, owned by an actual seller, for sale over an internet exchange portal; selling a right to market the used goods to a virtual seller; marketing the used goods over the portal under direction of the virtual seller; identifying an actual buyer; and selling the used goods to the actual buyer.

24 Claims, 8 Drawing Sheets

REVERSE LOGISTICS METHOD FOR RECAPTURING VALUE OF USED GOODS OVER INTERNET EXCHANGE PORTALS

BACKGROUND OF THE PRESENT INVENTION

1. Field of the Present Invention

The present invention relates generally to systems and methods for selling used goods through internet auction sites, and more particularly to a reverse logistics method for recapturing value of used goods over one or more internet exchange portals.

2. Discussion of Background Art

Ever since the industrial revolution, rapid technological advancements have created a need for corporations, schools, universities, and governments to constantly upgrade their technology infrastructure to remain competitive. Suppliers often identify such customers as "strategic-account customers" which refers to large customer segments whose need is to constantly remain on the forefront of technology in order to remain competitive. In the United States, many strategic-account customers repurchase their personal computer infrastructure as often as every year to remain competitive, because rapid technological advancements result in obsolescence of the previous computer infrastructure purchases.

For example, FIG. 1 is a pictorial diagram of a traditional model 100 for a "vertical distribution supply chain" of capital asset flow used in the 1980s and early 1990's. Traditional high technology computer manufacturers 102 sold capital equipment to strategic-account customers 104 through a series of intermediaries, known as dealers and distributors 106. After the equipment was no longer useful to a strategic-account customer, the equipment was either sold to a secondary dealer/distributor 108 at a substantial loss or left for scrap 110 resulting in a potentially large disposal cost.

During this era, computer manufacturers opted for the dealer/distributor mechanism for two major reasons. The first reason was the "hi-touch" requirement of selling personal computers. Because personal computers were new consumer products, high technology computer manufacturers needed dealer/distributor networks to assume the role of building product awareness, customer bases, and opening retail stores, so that manufacturers could focus on creating new and innovative products, and not have to worry about building product awareness, customer bases, or opening retail stores around the world.

The second reason for the dealer/distributor mechanism involved warranty and service. High technology computer manufacturers felt that cost savings could be realized by having warranty and service handled by dealers/distributors who were in direct contact with the customer. Additionally, dealer/distributor storefront operators provided manufactures greater visibility and brand recognition of their product to customers. Therefore dealer/distributor networks acted as agents for administering warranty and service for high technology computer manufacturers without building of internal service departments within high technology companies.

While high technology computer manufacturers selling and manufacturing new wares generally do not deal in older obsolete computers, they were beginning to realize that a build up of these old products was destabilizing their companies, tying up cash flow, and confusing their distribution channels. The strategic-account customers were similarly faced with huge burdens of accounting for previously purchased, but now obsolete, computer infrastructures.

Computer dealers, who oftentimes were family owned businesses begun by enterprising entrepreneurs who sought to maximize revenue from each sale, found it difficult to make money selling solely based on price, because of the intense competition in the dealer/distribution channel. For this reason, many computer dealers began seeing huge revenue opportunities in secondary market related service transactions.

For example, as strategic-account customers decided they needed to repurchase new computer infrastructure yearly, computer dealers found that they could repurchase existing computer infrastructure, often times sold just a year previous, at steep discounts. For example, if a large beverage manufacturer purchased $2,000,000 of computer infrastructure in year 1991 from a computer dealer, it was not unusual to see just a year later, in 1992, the market value of that purchase drop to $1,200,000 as a complete unit because of rapid technological advancement. Because most strategic-account customers are in the business of providing goods and services unrelated to computers and lack domain expertise of the computer industry, strategic-account customers often perceive the current market value of the computer infrastructure purchased in 1991, the beverage manufacturer's perception is that the market value of the computer infrastructure purchased in year 1991 is virtually nothing. As a result, when a large beverage manufacturer seeks to replace old computer infrastructure purchased a year ago, one of two things usually happened. First, the old purchased inventory was moved to a scrap warehouse, where it would sit until it was later sold off at a general auction along with other excess/discarded equipment, furniture, etc. for pennies on the dollar. For example, the $2,000,000 purchase in 1991 may be sold in a general auction by the beverage manufacturer's auctioneer in 1994 for $1000. This occurred because obsolescence quickly erodes the market price of computer infrastructure and it was typical to see that visible market value of whole computers drop to virtually nothing after three years. Second, the $2,000,000 computer infrastructure purchased by the strategic-account in 1991 was sold to a computer dealer selling new infrastructure in 1992 for $300,000. From the beverage manufacturer's view, the second scenario of recovering $300 K for the 1991 inventory is much more attractive than letting the inventory move to a scrap warehouse, where the recovery value was minimal.

However, due to the computer dealer's domain expertise, the computer dealer purchasing the old computer infrastructure for $300,000 could often times rapidly sell the $300,000 purchase of 1991 inventory often times for as high as $750,000 on a secondary distributor market. The secondary distributors would again sell the inventory (often times broken in smaller lots or in parts) to smaller secondary dealers and buyers around the world, until the full market value of $1,200,000 was nearly realized. Because of its lack of domain expertise, the beverage manufacturer incurred a substantial loss in terms of lost opportunity cost. The same lost opportunity cost can be seen in several industries.

In addition, computers, printers, and other electronic/mechanical devices are often comprised of parts. These parts are listed on a Bill of Materials, containing all the components making up a computer or electronic device. In order to create supply chain efficiencies, computer engineers and supply chain experts would often times try to use as many "common parts" between older generation hardware and new generation hardware. Therefore the "common parts" in a 1991 computer infrastructure, for example, may have more value in 1992 than the infrastructure as a whole, if segments of its Bill of Materials were sold individually. Such common parts often include, for example, memory, hard drive, monitor, floppy drive, or other components which have been traditionally maintained in a plurality of computer generations. Customers for these common parts may include, for example, computer service centers, parts brokers, small computer manufactures, businesses looking to upgrade their hard drives or memory, and consumers looking to fix their out-of-warranty computers.

Finding these customers in a non-internet world, however, is extremely difficult without tying up cash flow for extended periods of time. For this reason, and because obsolescence affects the market value of computers dramatically, computer dealers often simply sold year old model computers as a whole. Therefore, not only did the beverage manufacturer incur lost opportunity cost, but the computer dealer also effectively incurred a lost opportunity cost in cash flow allocation and timely consummation. This usually occurred because the computer dealer did not have the cash flow stability nor the volume of high technology industry secondary markets parts buyer contacts to know or realize the true market value of the parts within the hardware purchased from the beverage manufacturer. However, in the mid-1990s, manufacturers began reinvented their distribution channels by selling their wares directly to strategic-account customers and bypassing traditional dealer/distributor networks.

FIG. 2 is a pictorial diagram of a current trend 200 in capital asset flow. In the current trend 200, a manufacturer 202 directly sells capital equipment to a strategic-account customer 204. Having a direct relationship with strategic-account and end-user customers yielded huge profitability and supply chain optimization advantages for companies. Manufacturers were better able to schedule production, lower manufacturing costs, and capture more business by selling directly to strategic-account and end-user customers without the added costs of a dealer/distribution network. Traditional high technology computer manufacturers were forced to compete with these companies in order to remain viable; and for this reason, many companies shifted to the direct model. Yet, after the useful life of the equipment, disposal remains a problem and the customer 204 usually sells the equipment for scrap 206.

Thus the current trend has made the losses in asset value recovery even worse when measured from a lost opportunity cost standpoint as done in the 1980's to early-1990's analysis. As the computer manufacturers have moved to a direct model of selling to their strategic-account customers utilizing direct sales mechanisms such as web stores, company owned stores, direct catalogs, many computer dealers have gone out of business. Unable to compete with the manufacturers directly, many computer dealers had to shift their focus to value added software integration providers, known in the industry as "VARs" (Value Added Resellers), and away from selling new products and repurchasing existing preexisting computer infrastructure as they did earlier.

Increasingly, the asset recovery of previously sold computer infrastructure has gone from strategic-account customers directly to scrap warehouses, resulting in massive losses when measured in lost opportunity cost. The problem is further complicated because strategic-account customers may interchangeably replace their computers with a different computer manufacturer. For example, a beverage manufacturer might replace its Compaq computers purchased in 1991 with computers Hewlett Packard in 1992. The latter manufacturer is unlikely to take in another manufacturer's older equipment as it is likely to destabilize and defocus the manufacturer from selling new computers. As a result, not only is there lost asset recovery for the beverage manufacturer but its budget for purchasing new computer infrastructure is less than if it were able to quickly recover the true market value of its existing infrastructure.

Even now, high technology commodities vendors have not moved to a direct sales model for strategic-account customers because of the immense problems related to previously sold infrastructure. Ever since the early 1980's to the current day, commodities manufacturers, comprising memory manufacturers, monitor manufacturers and microprocessor manufacturers have sold through dealer channels or through OEM (Original Equipment Manufacturer) relationships with computer manufacturers who use hard drives, memory, and microprocessors as parts when manufacturing computers. Because of the rapid technological advances in memories, hard drives, monitors, and microprocessors, and because of fierce competition, these markets have largely become "commodity" products, which have a very short shelf life before devaluing rapidly. Memory and hard drive manufacturers have suffered significantly due to immense international competition and lower barriers to entry. On the other hand, computer dealers have seen hard drives, monitor, memory, and microprocessor upgrades as a potential money making opportunity. Because strategic-account customers sometimes do not need all new infrastructure, and instead opt for simply a hard drive upgrade or memory upgrade, computer dealers have been able to offer strategic-account customers price points, which memory manufacturers, hard drive manufacturers, and microprocessor manufacturers could not directly match.

The reason for this has to do with "trade ups." A "trade-up" refers to a dealer's ability to capture and take ownership of existing memory chips and hard drives within a computer, while offering a single price of upgrade to a strategic-account customer. The reason for a trade-up is complex. First, the computer dealer may take ownership of a hard drive made by a variety of manufacturers by offering a "trade-up" service. In this case the computer dealer may offer a separate service for "installation" and "data transfer" and may charge an additional amount per hard drive sold. For this reason, the computer dealer may actually end up recovering a substantial profit for each hard drive. Hard drive manufactures are generally unwilling to balance the cost of the old hard drive, because they do not want to tie up their available cash by taking ownership of old hard drives that they did not manufacture, or destabilize their focus by selling used drives which also hyper-depreciate (such as hard drives, ram, and microprocessors), and also because the used drives may in fact be made by a competing manufacturer. For this reason and as seen in similar industries as the microprocessor, monitor, and memory space, these commodity manufactures have never gone to a direct sales model, and therefore have not been able to optimize their manufacturing costs properly by better gauging customer demand. Moreover, they have not been able to obtain higher profit margins by selling direct.

In response to the concerns discussed above, what is needed is a system and method for selling used goods through internet auction sites that overcomes the problems of the prior art.

SUMMARY OF THE PRESENT INVENTION

The present invention is a reverse logistics method and system for recapturing value of used goods over one or more internet exchange portals. The methods includes the following steps: offering used goods, owned by an actual seller, for sale over an internet exchange portal; selling a right to market the used goods to a virtual seller; marketing the used goods over the portal under direction of the virtual seller; identifying an actual buyer; and selling the used goods to the actual buyer.

The present invention is contemplated as being most applicable where the used goods are subject to rapid depreciation, such as computer hardware, the virtual seller is a manufacturer of new goods, the actual seller is a strategic account customer of the manufacturer, and the manufacturer charges the strategic account customer a lower price for acquiring the new goods in exchange for marketing the used goods. The present invention thus gives manufactures who sell directly to their strategic accounts a more direct role in ridding their strategic account customer's of obsolete goods and thus clearing a supply chain lane for the manufacturer to sell the strategic account customer updated replacement goods.

As part of marketing the used goods, the virtual seller categorizes the used goods and differentiates marketing by category. Categories include condition, marketability, and functionality levels. Used goods may be virtually differentiated into a plurality of categories simultaneously marketed to obtain a maximum value for the actual seller.

The virtual seller preferably does not take an ownership interest in the used goods which they market on behalf of the actual seller, but instead expertly directs marketing and sale of the used goods. This benefits actual sellers by allowing technology value recapture maximization without substantial investment, focus or effort.

In addition, since the present invention allows for rapid recovery of used technology assets before obsolescence affects market value, the actual seller's total cost of ownership in capital assets is reduced, thereby translating into lower fixed and variable costs of operation; which can ultimately translate into higher profitability. Furthermore, IT budgets at strategic-account customers could also significantly increase by recapturing value of previously purchased technology infrastructure.

Virtual sellers further benefit because they are able to directly compete with computer dealers and offer value-added expert marketing services, effectively shifting virtual sellers from mere commodities merchants to a value added service providers.

The present invention also functions as a recycling tool for minimizing waste and disposal. Thus, instead of used goods, which still have market value, ending up in landfills, the present invention enables such goods to be reused and recycled until such goods are truly defective and/or no longer useful to anyone.

Virtual escrow services are also provided through the present invention by inserting a delay mechanism between when the actual buyer agrees to enter into a contract with the actual seller and when the actual buyer's creditor releases payment to the actual seller.

These and other aspects of the present invention will be recognized by those skilled in the art upon review of the detailed description, drawings, and claims set forth below.

DETAILED DESCRIPTION OF THE PREFERRED EMBODIMENT

Figure 1:
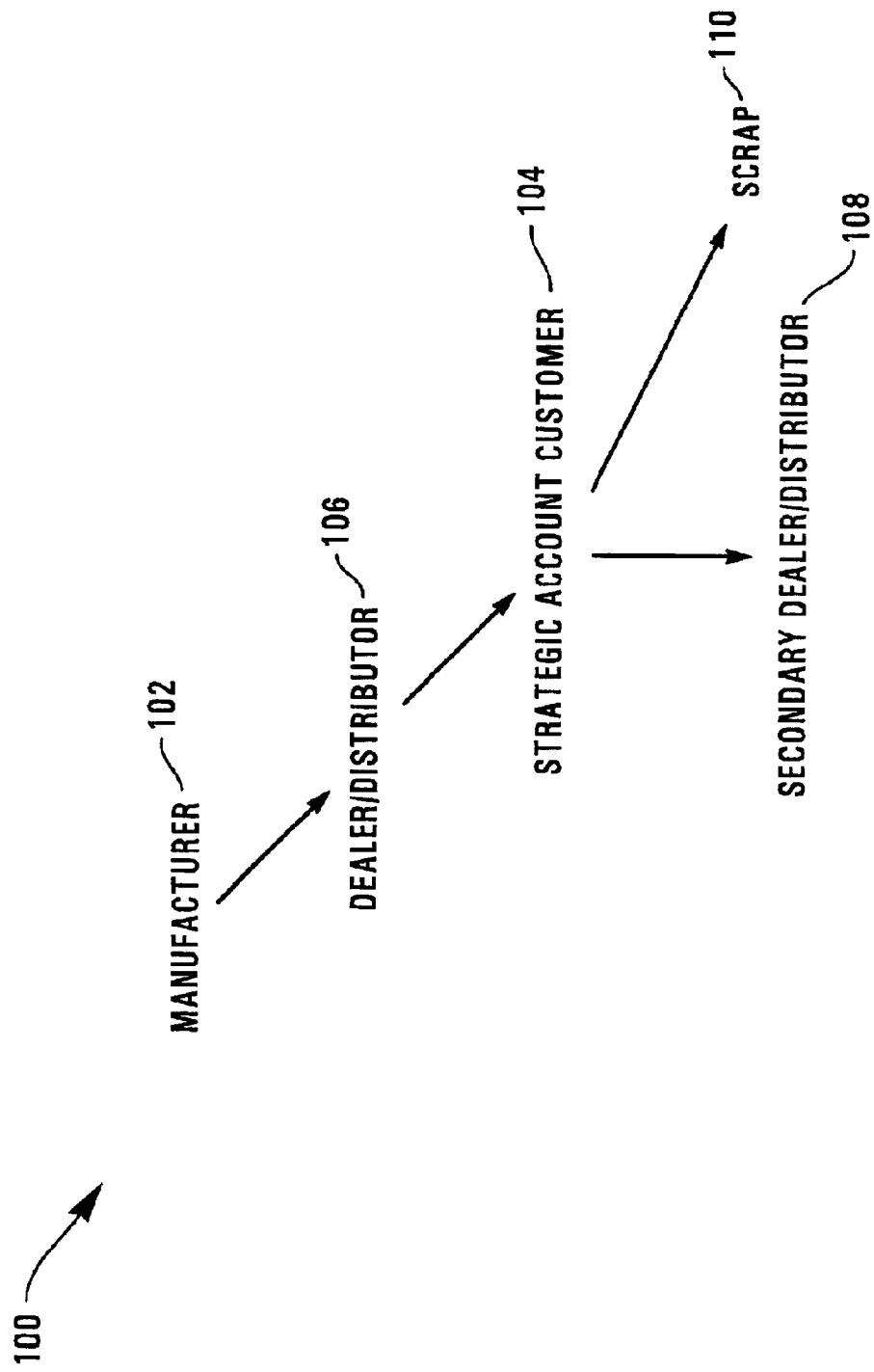
FIG. 1 is a pictorial diagram of a traditional model of capital asset flow.
Figure 2:
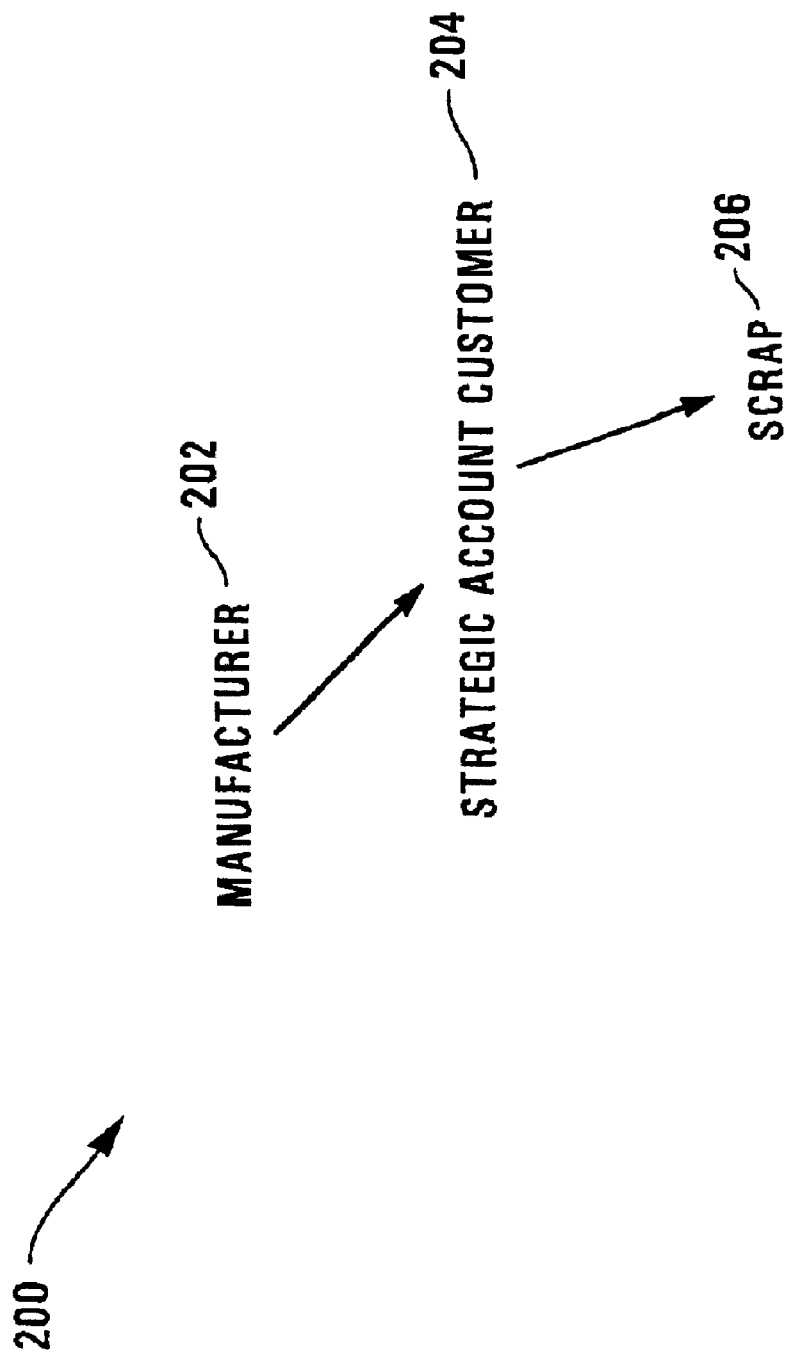
FIG. 2 is a pictorial diagram of a current trend in capital asset flow.
Figure 3:
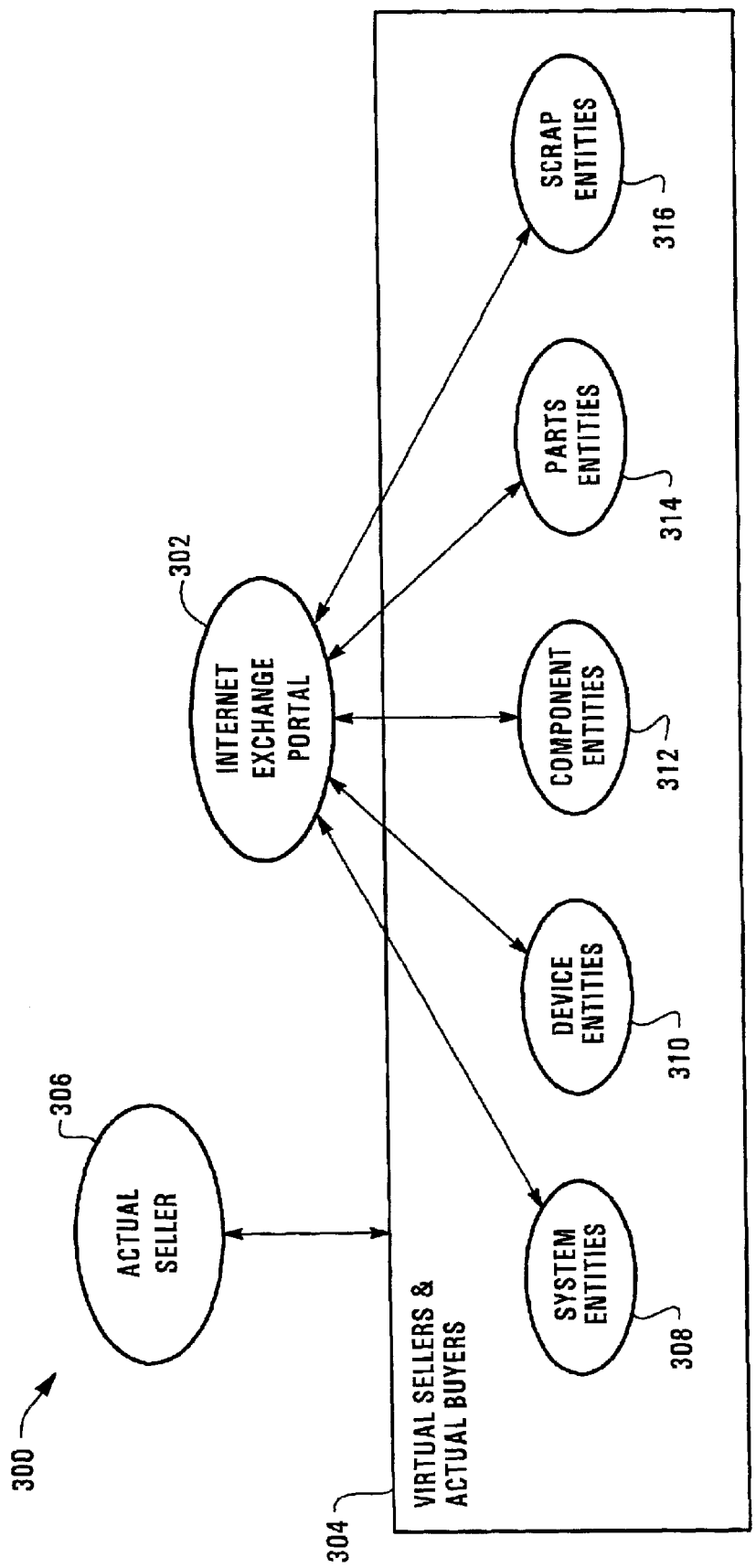
FIG. 3 is a dataflow diagram of a reverse logistics method for recapturing value of used goods over one or more internet exchange portals.
Figure 4:
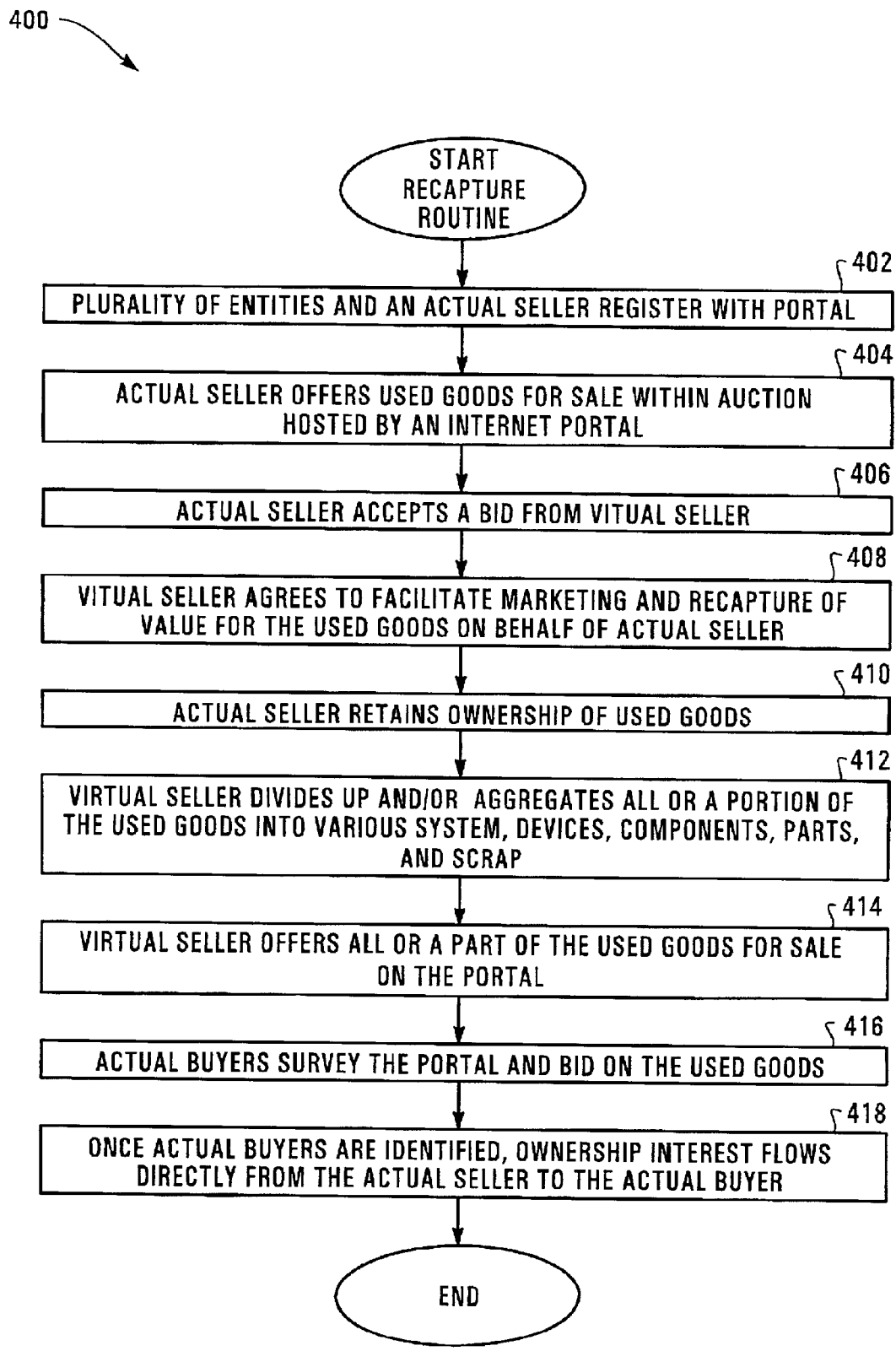
FIG. 4 is a flowchart of the reverse logistics method.

FIG. 3 is a dataflow diagram 300 of a reverse logistics method for recapturing value of used goods over one or more internet exchange portals using virtual sellers 304, and FIG. 4 is a flowchart of a method 400 for doing so. The method 300 and flowchart 400 of the present invention are discussed together.

Reverse logistics is herein defined as a process for consummating unwanted and/or obsolete used systems, devices, components, and parts back through supply chains. The method begins in step 402 where an actual seller 306 and a plurality of virtual sellers and actual buyers 304 register with an internet exchange portal 302 to transact business.

The actual seller 306 is an entity which currently owns a set of used goods which the actual seller 306 either needs to dispose of or replace with more modern goods. Actual sellers who regularly need to replace current capital assets are often labeled "strategic-account customers" by those manufacturers or other entities who sell them replacement goods.

The virtual sellers and actual buyers 304 can, in one embodiment of the present invention, be categorized into system entities 308, device entities 310, component entities 312, parts entities 314, and scrap entities 316. The system entities 308 include those who deal in whole systems, such as computer manufacturers who sell complete server and LAN systems. The device entities 310 include those who deal in devices within a system, such as manufacturers or dealers who sell or buy stand alone computers or printers. The components entities 312 include those who deal in components within devices, such as manufacturers who sell disk drives to device manufactures. The parts entities 314 includes those who deal in parts which make up components, such as manufacturers who sell motors to disk drive manufactures. The scrap entities 316 includes those who deal in scrap or defective systems, devices, components, and parts, such as those who harvest gold and other materials from PC boards, shredders, landfill exchanges.

All of the entities discussed above may function as authorized dealers, distributors, brokers, traders, merchants, resellers, secondary market players. Those skilled in the art know that the above categorizations of entities are arbitrary and that many other entities can also register and participate as virtual sellers and actual buyers 304 within the method of the present invention. Some entities may only act as virtual sellers, others only as actual buyers, and yet others as both. Together, however, the entities create a substantial marketplace for marketing and bidding upon the actual seller's 306 used goods.

In step 404, the actual seller 306 offers the set of used goods for sale within an auction hosted by the portal 302. The offer may specify a predetermined window in which bids for the used goods will be considered.

In step 406, the actual seller 306 accepts a bid from a first virtual seller from the set of virtual sellers 304. Note the actual seller 306 could have accepted a bid for the used goods directly from one of the actual buyers 304, in which case a normal contract for sale of the used goods would be entered into between the actual seller 306 and the one of the actual buyers 304. A virtual seller, alternatively known as a "new seller," differs from an actual buyer in that the virtual seller does not take actual ownership of the used goods.

Instead, in step 408, the virtual seller enters into a contract with the actual seller to facilitate marketing and recapture of value for the used goods on be behalf of the actual seller 306. In step 410, the actual seller 306 still retains ownership of the used goods, effectively trading short term ownership burden for significantly higher recapture value recapture.

The virtual seller takes responsibility for identifying other entities within the virtual sellers and actual buyers 304 who will either continue to facilitate marketing or take actual ownership of the used goods respectively. The virtual sellers and actual buyers 304 may be any single or group of the entities 308 through 316. Even the portal 302 can act as a virtual seller. In this way virtual sellers facilitate large scale transactions within Business-to-Consumer (B2C) nodes, and Business-to-Business (B2B) nodes.

In a case where the virtual seller is a manufacturer, such value recapture contracts not only rids the actual seller 306 of the used goods, but may help convince the actual seller 306 to upgrade to new goods offered by the virtual seller. Such virtual seller could even quote the actual seller 306 one discounted price for both disposing of the used goods and providing the new goods. Alternatively, such virtual seller could provide a credit to the actual seller 306 for the used goods, such as an upfront credit, a discount on invoice, or rebate.

In step 412, the first and each subsequent virtual seller may divide up and/or aggregate all or a portion of the used goods into various categories. In fact, through division and/or aggregation of the used goods, virtual sellers add value to the marketing of the used goods, such that the actual seller 306 realizes a much greater market value for the used goods. Step 412 is further elaborated upon with respect to FIGS. 6 and 7 below.

For example, the actual seller 306 may own and wish to be rid of a used server system, however, the actual seller 306 has little if any expertise in who might be interested in buying the used system and/or how much the used system could fetch if divided up and sold piecewise. Virtual sellers 304 who do have such expertise, can step in and help market the used goods such that the value recaptured can be very close to full market value. An additional advantage of the present invention is that the actual seller 306 need not formulate a strategy for recapturing the value of the used goods.

The virtual seller, in step 414, then offers the various categories of used goods for sale on the portal 302. The virtual seller chooses which portals or exchanges to market each category of used goods on. Some goods categories may have an international market, while others only have domestic or regional markets. Studies can also be made or retrieved indicating which markets currently offer goods of lesser functionality than an average computer in a particular geographic region, after which the experts can target offers to portals servicing that region. Usually however, the used goods would be marketed over globally accessible portals in order to recapture maximum value for the actual seller 306.

If there are significant quantities of used goods to sustain aggregate sales to dealers in the region, then the used goods may also be aggregated and marketed over the portal 302 to secondary dealers. Otherwise, the used goods can be marketed over B2C portals. Used goods in a totally defective condition can be marketed to the scrap entities 316, for meltdown, resale, or remanufacture. Used good containing hazardous wastes can be posted for reverse auction bid through portal hosting various land management services.

In step 416, the actual buyers 304 survey the portal 302 and bid on the used goods. Thus the present invention provides actual buyers with visibility into supply chain spot market opportunities. Virtual sellers can also identify actual buyers through strategic partnerships with other vertical market exchanges, other virtual portal services, or other founder dealers who are automatically migrated by aligning their existing financial flows through the portal 302. The portal 302 may also have a posting and/or catalog offering, where visibility of spot market opportunities are developed through a bulletin board or catalog like representation of divided and/or aggregated used goods. This allows for greater efficiencies in global marketplaces, and creates a whole new way of intermediaries to procure, buy, and sell secondary market spot market opportunities through a web mechanism since now they will gain catalog visibility to subcomponent spot market opportunities that was virtually impossible to do in a non-internet world.

Virtual sellers can also avail themselves of any number of "low touch" auction services which the portal 302 may provide in order to identify actual buyers for the used goods. A low touch auction engine is similar to that of a "classifieds" posting board in a traditional newspaper. An electronic version of such a "classifieds" posting system in herein being referred to as a "low touch" auction service.

When setting a price for the used goods, virtual sellers can dynamically adjust "reserve prices" on for various sets of used goods by linking B2B connection nodes to B2C and Consumer-to-Consumer (C2C) nodes. Actual buyers of whole systems of used goods can then effectively compete with actual buyers of devices, components and/or parts through a floating and dynamically adjusting reserve price.

The virtual sellers can also provide support services such as customer relationship management by handling questions, problems, or concerns that actual buyers may have with a particular purchase. In order to facilitate sale of the used goods between the actual seller 306 and the actual buyer, the portal 302 may also provide virtual escrow services. An example of one such escrow service is discussed with respect to FIG. 8 below. Once actual buyers are identified, ownership interest flows directly from the actual seller to the actual buyers, in step 418.

The portal 302 or the virtual sellers 304 can serve as financial aggregation nodes for providing financing to and collecting payments from the actual buyers 304. The portal 302 can receive revenue by deducting a commission from funds paid from the actual buyer to the actual seller. Virtual sellers 304 who prompt or refer actual buyers 304 to the actual seller 306 may also receive a portion of the funds paid. Any sort of commission and/or incentive structure may be negotiated between the portal 302 and all of the entities depending upon each implementation of the present invention. Compensation can also be allotted based on estimations of value added by the portal 302 or the virtual sellers 304 who divide and/or aggregate used goods from many different actual sellers, such as when the virtual sellers hire "teams of consultants" having domain expertise in technology, industry, secondary markets, and actual buyers transacting business over the portal 302 in order to value maximize the actual seller's 306 used technology assets. The portal 302 may also receive revenue through value added services such as extended warranties.

The portal 302 may also provide a set of optional services which can be integrated or it offered in parallel with the present invention. This suite of services preferably includes: 1) B2B Hi-Tech Asset Maximization Services, having: B2B Auctioning Strategy and Execution; Refurbishment Services; Inspection Services; Reverse Logistics Services; Market Maker Services; and Warranty Services; 2) off-Lease Services; 3) Charity Services; 4) Reverse Logistics Services, including Data Cleansing, Packaging, Transportation, Customs/International, Segmentation, and Virtual Warranty services; 5) Consignment Based Services, including: Disassembly, Subassembly management, Warehousing, and Refurbishment services; and 6) Market Pulse Services, including: B2C Market Gauge Services, Virtual Dealer Services, Inspection Services, Refurbishment Services, Inspection Services, Reverse Logistics Services, Market Maker Services, Warranty Services, Destruction Services, and Landfill shift Services. These value added services may be tailored to each portal user, industry, or used goods type.

Figure 5:
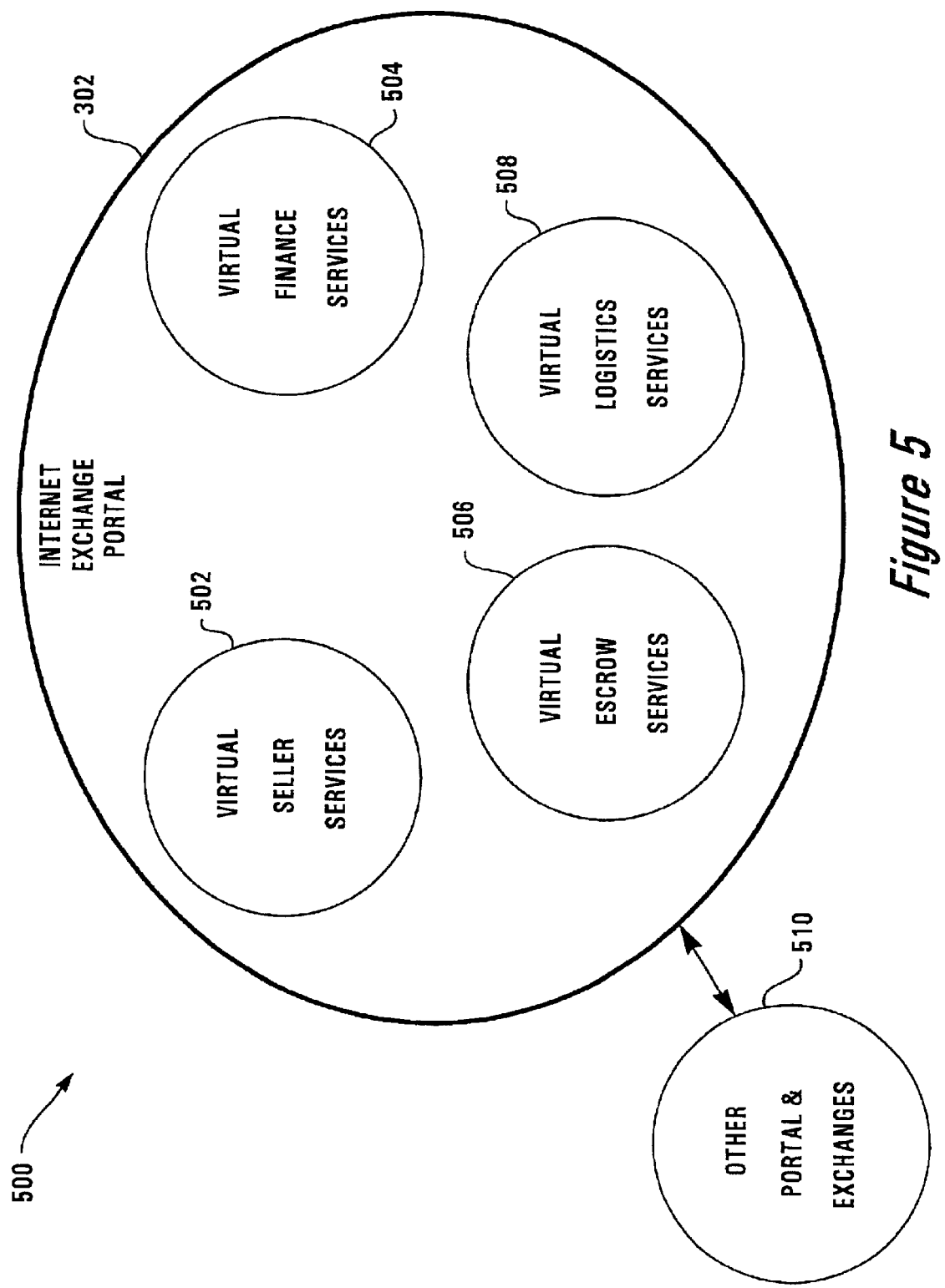
FIG. 5 is a dataflow diagram of other portal services available to buyers and sellers.

FIG. 5 is a dataflow diagram 500 of other portal services available to buyers and sellers who do business over the portal 302. In addition to the virtual seller services module 502, described with reference to FIGS. 3 and 4 above, the portal 302 may also host a virtual finance services module 504, a virtual escrow services 506, and a virtual logistics services module 508. The virtual finance services 504 available to the actual buyers 304 are discussed in part in co-pending patent application Ser. No. 09/774,449, entitled, "A SYSTEM AND METHOD FOR CONSOLIDATING FINANCING IN AN INTERNET EXCHANGE PORTAL." The virtual escrow services 506 are described with reference to FIG. 8 below. The virtual logistics services 508 are discussed in part in co-pending patent application Ser. No. 09/785,760, entitled, "A METHOD FOR ALIGNING FINANCIAL AND LOGISTICAL FLOWS WITH AN INTERNET EXCHANGE PORTAL." The portal 302 also is linked to various other portals and exchanges 510.

Figure 6:
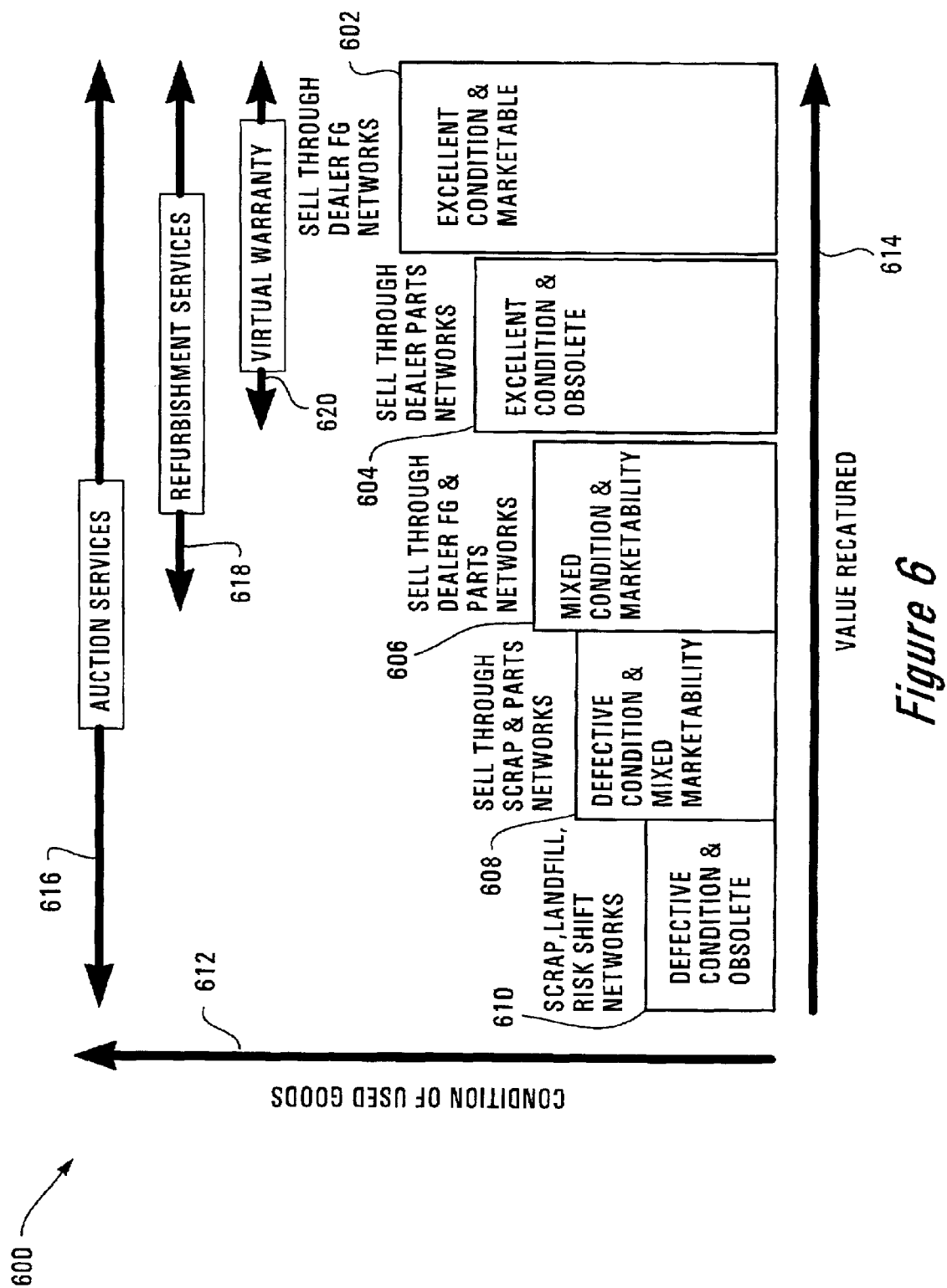
FIG. 6 is a pictorial diagram of a method for dividing and aggregating the used goods.
Figure 7:
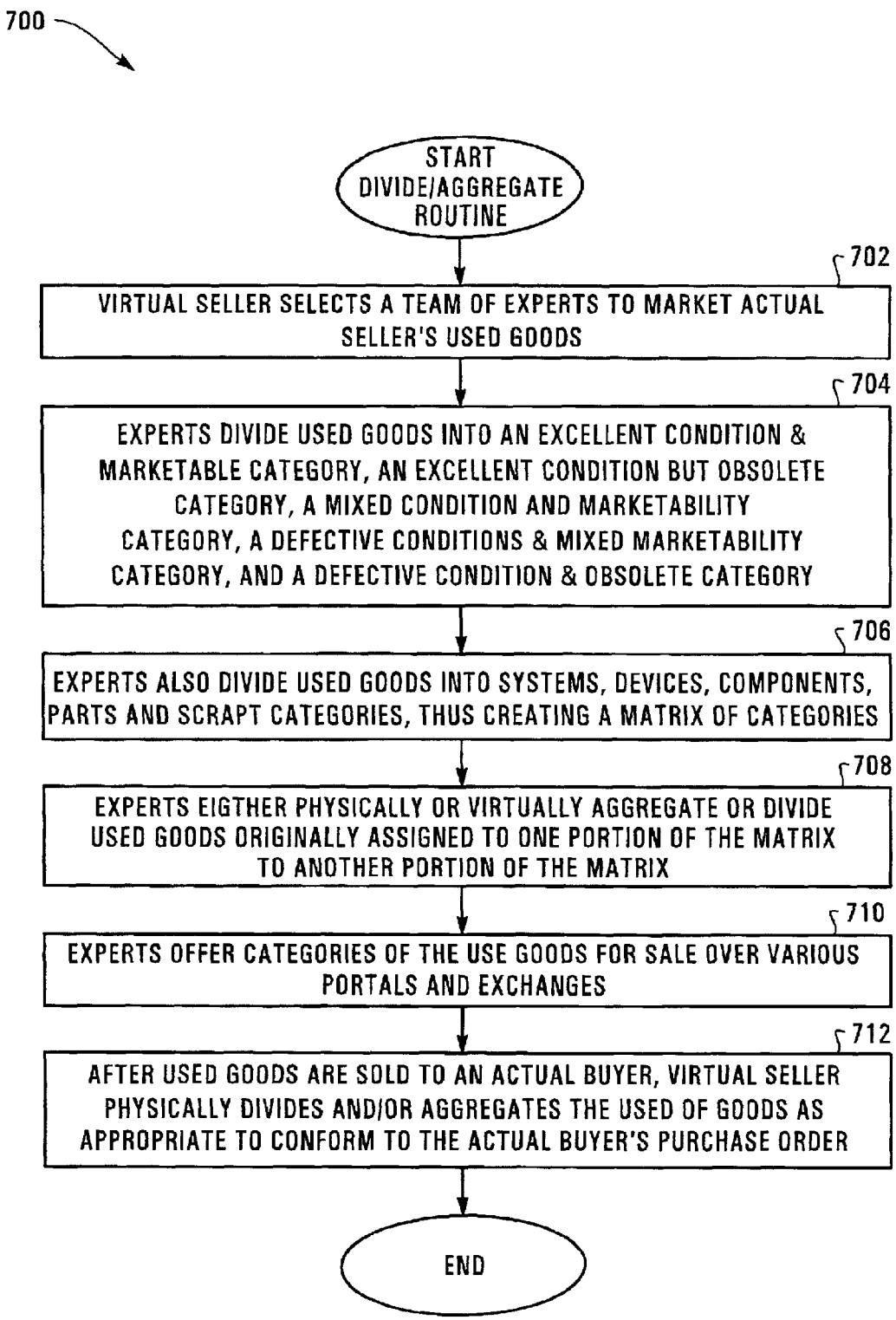
FIG. 7 is a flowchart of a method for dividing and aggregating the used goods.

FIG. 6 is a pictorial diagram 600 of a method for dividing and aggregating the used goods, and FIG. 7 is a flowchart for doing the same. The diagram 600 and flowchart 700 are discussed together. The method begins in step 702 where the virtual seller, which the actual seller 306 has agreed to have market the used goods, selects a team of experts. The experts are preferably well versed in technology and marketing of the used goods.

The experts arbitrarily assign the used goods to one of a matrix of categories/groups. In step 704, along a condition of used goods axis 612, the used goods are divided into one of four categories: excellent/acceptable condition & marketable 602, excellent/acceptable condition but obsolete/unmarketable 604, mixed condition/acceptability and marketability 606, defective/unacceptable condition & mixed marketability 608, and defective/unacceptable condition & obsolete/unmarketable 610.

A value recaptured axis 614 predicts that a greater value will be recaptured for used goods in category 602 than for used goods in category 610, with a continuum in between. In step 706, the used goods are arbitrarily divided into various along a types/functionality-levels including systems, devices, components, parts and scrap/materials.

In step 708, used goods initially assigned to more than one category in the matrix may be aggregated together into a single matrix category. Similarly, used goods initially assigned to only one category in the matrix may be divided up between several matrix categories. This aggregation and division can be either literal or virtual. If the aggregation and division is literal, then the used goods in each category are physically located nearby, perhaps even on a single pallet, and ready for immediate shipment.

If the aggregation and division is virtual, then the used goods in each category may be physically located in several different geographic warehouse locations, even though they are being marketed over the portal 302 as a single shipment lot. Virtually aggregated and divided goods may be shipped directly to the actual buyer from each of the several different warehouses.

Through the use of virtual aggregation and/or division, the virtual seller significantly increases the marketability of the used goods by simultaneously offering the used goods in several different matrix categories without literally having to physically aggregate or divide the offered goods.

For instance, the experts may receive used systems and used components from the actual seller 306. The used systems may fall into the mixed condition and marketability category 606 and the used components may fall into the excellent condition & marketable category 602. The expert may then identify which of the used systems in the mixed condition and marketability category 606 are in excellent condition & marketable, are in excellent condition but obsolete, are in defective conditions and have mixed marketability, and are in defective condition and obsolete. The experts could then reallocate the used systems to those respective categories 602, 604, 608, and 610. Of the used systems which were reallocated into the defective conditions and have mixed marketability category 608, the experts could obtain a components list for such used systems and either literally or virtually reallocate such defective systems into the devices, components, parts, and scrap categories. Those components from the defective systems which fall into the excellent condition & marketable category 602 could then be either literally or virtually aggregated with the used components originally received from the actual seller 306. Those skilled in the art recognize that there are a very large number of permutations and combinations available to the experts as they divide and/or aggregate the used goods between all of the categories.

To help divide and aggregate between the various categories, original bills of materials, parts lists, and such either obtained directly from original manufacturers, or from the actual seller's 306 service manuals. Parts which can be used in a series of different models from a variety of manufactures usually have a much greater recaptured value than parts used in only a few models or manufacturers.

While auction services 616 of the portal 302 may be used for all categories, refurbishment services 618 and virtual warranties 620 are preferably limited to certain categories of used goods.

Next in step 712, after the used goods are sold to an actual buyer and the virtual seller physically divides and/or aggregated the used goods as appropriate to conform to the actual buyer's purchase order.

Figure 8:
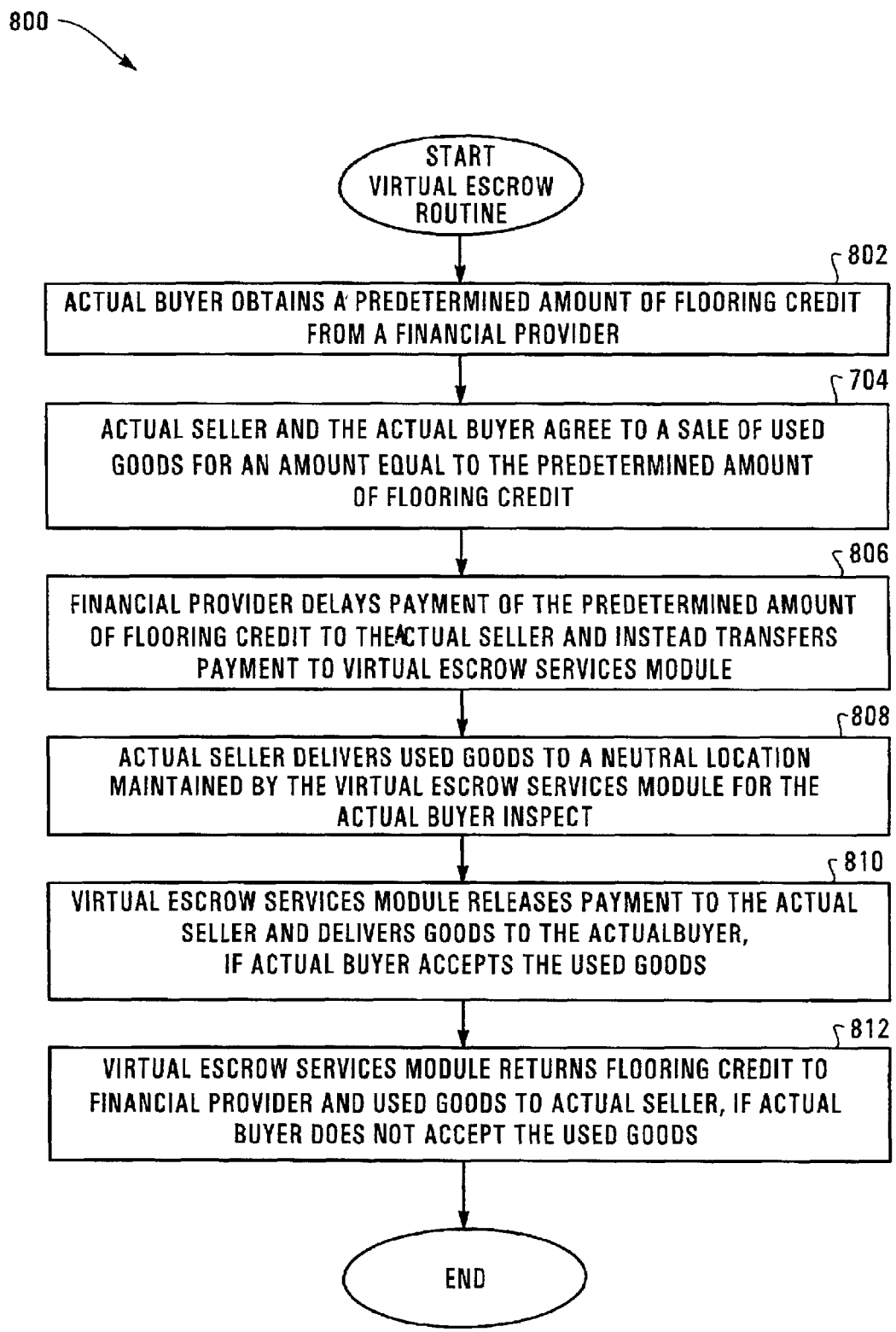
FIG. 8 is a flowchart of a method for offering virtual escrow services to buyers for goods purchased over the portal.

FIG. 8 is a flowchart 800 of a method for offering virtual escrow services to the actual buyers 304 for goods purchased over the portal 302. The flowchart 800 is discussed in conjunction with the diagram 500 of FIG. 5.

Uniform Commercial Code (UCC) laws give the actual seller 306 a right to exclude any actual or implied warranties of fitness through contract language such as: "as is," "with all faults," or any other similar language; however, such exclusions tend not to appear in internet auctions, since such offers are often ignored by the actual buyers 304. Even when actual or implied warranties of fitness are not excluded, there often remains a certain lack of trust between an actual buyer and the actual seller 306.

Escrow services can be provided throughout each of four steps relevant to auction transactions. These steps are agreement, payment, delivery, and inspection. First, the agreement step is defined as when the actual buyer and actual seller negotiate terms and information for a purchase contract. Both must accept the terms of the agreement for a sale to proceed. Second, the actual buyer submits payment to a trusted intermediary. The trusted intermediary then secures the payment in a trust account, after which the actual seller is notified that the actual buyer's payment is securely held in escrow. Third, the actual seller delivers the used goods to the actual buyer. Fourth, the actual buyer decides to accept or reject the used goods within an inspection period agreed to by both parties. If the buyer accepts the goods, the trusted intermediary releases the funds to the seller. If the buyer is unhappy with the goods, payment is returned to the buyer after the seller inspects and accepts the returned merchandise.

Escrow service providers are particularly useful when buyers and sellers wish to remain anonymous, or when there is a clear lack of trust between a buyer and seller, or when refurbished, Defective-On-Arrival (DOA), End-of-Life (EOL), spot market, reverse auction raw materials/components, or various other products are bought and sold. Escrow service providers basically help to minimize risk of fraud, misrepresentation, and misappropriation, which can arise from internet auction transactions over the portal 302. One example of an escrow service provider is Escrow.com located in Santa Ana, Calif.

The virtual escrow method begins in step 802 where the actual buyer obtains a flooring credit line from a financial provider identified by the virtual financial services module 504 (see FIG. 5). In step 804, the actual seller and the actual buyer agree to deliver and pay for the used goods respectively. The virtual financial services module 504, however does not immediately release payment on behalf of the actual buyer to the actual seller. Instead, in step 806, the virtual financial services module 504 delays payment by transferring payment funds to the virtual escrow services module 506. In step 808, the actual seller uses the virtual logistics services module 508 to deliver the used goods to a neutral location maintained by the virtual escrow services module 506 for the purposes of letting the actual buyer inspect the used goods. If the actual buyer accepts the used goods, then the virtual escrow services module 506 releases payment to the actual seller in step 810 and the virtual escrow services module 506 instructs the virtual logistics services module 508 to deliver the used goods to the actual buyer. Otherwise, the virtual escrow services module 506 returns the funds to the financial provider and the used goods to the actual seller, in step 812. Those skilled in the art recognize that in alternate embodiments of the present invention conventional financial and logistical services can be used in conjunction with the virtual escrow services module 506.

In order to more fully appreciate the usefulness of the present invention, an example scenario using the present invention is provided below. Those skilled in the art recognize that the following example scenario in no way limits the scope of the present invention, and further that the example is not necessarily presented to suggest a best mode contemplated.

EXAMPLE SCENARIO

A huge indirect benefit of the present invention is in a total cost of manufacturing products. Through the present invention, the total cost of manufacturing hi-tech products will drop dramatically, by allowing a mechanism whereby to sell through "pre-purchased manufacturing equipment" through an internet portal. To understand this, consider the following example. Suppose Applied Materials sells Hewlett Packard company the new Robo4000 robot for $50 million dollars, capable of manufacturing 4000 LaserJet motherboards in an hour in 1994. In 1995, Hitachi Automation Group comes out with the SuperDuper5000, a hi-speed robot, capable of manufacturing 10,000 LaserJet motherboards in 1 hour for $45 million. Hitachi Automation wants to sell the new SuperDuper5000 to Hewlett Packard, and Hewlett Packard wants to buy it, however Hewlett Packard has no idea what to do with the old Applied Materials Robo400 it just bought a year previously for $50 million. In the current system, often times Hewlett Packard makes a cost trade off decision, and either decides to not buy the SuperDuper5000, or buy it and sell the Robo4000 for scrap for $5 million dollars.

Suppose there is a company like Beijing Industries in China that would love to own a Robo4000, since that company doesn't need to manufacturer 10,000 motherboards an hour, and would be perfectly happy to buy a Robo4000 for $20 million dollars. Because Hewlett Packard doesn't know that Beijing Industries has this need, nor does it's distribution channel touch and concern a supply chain of intermediary manufacturing equipment since HP is not in that business (HP is in the computer and printer business), Hewlett Packard's perception of the value of the Robo4000 is only $5 million. However, the supply chain system of Hitachi Industry does touch and concern intermediary manufacturing equipment, since Hitachi Industries core business is intermediary manufacturing equipment. Maybe Hitachi Automation knows that Beijing Industries and a few other companies have a need for something like the Robo4000, and better understands the bill of materials optimization strategies than does the portal. Suppose that a Supply Chain Director at Beijing Industries inquired to Hitachi Industries earlier in they year whether Hitachi Industries had a solution that could manufacturer 4000 motherboards an hour for around $20 million. Hitachi Industries previously had said no they don't have a new solution that fits that customer need, but had kept that information in a knowledge database.

By incentivising Hitachi Industries to refer this opportunity and to serve as a CRM (customer relationship management) node and value recapture optimization consultant, the "Virtual Escrow and Trade In invention" creates a mechanism whereby Hitachi can make money on referring the potential bidders of an Applied Materials Robo4000 through an internet portal ever taking ownership!

Suppose Hitachi knows that by parting out the Robo4000, the parts could potentially draw higher returns than selling the whole Robo4000, since the Robo4000's parts are similar but different to the Hitachi SuperDuper5000. During the reverse logistics value recapture maximization stage, such domain information from Hitachi might help to add insight as to the strategy needed to best asset maximize the Robo4000, and will potentially help increase split commission structures flowing back to Hitachi. If Hitachi Industries were to receive 2% for serving as a CRM (customer relationship management) and reverse logistics optimization consultant node, a sale of the Robo4000 from HP to Beijing Industries would translate into a $400,000 pure revenue opportunity for Hitachi, which might flow directly into the company's profitability, since it would be a "pure revenue stream". "Pure revenue stream" is a term of art in the high tech industry in which there are no costs of associated manufacture or warranty. Because the ownership will be transferred directly from HP to Beijing Industries, warranty representations if any would be the responsibility of HP! HP might decide to sell the Robo4000 as is, or might decide to offer a 20-day warranty. Additionally, HP might negotiate with the "Virtual Escrow and Trade In services" to shift the warranty burden to "HP Virtual Escrow and Trade In services" in exchange for a higher commission rate (e.g. "HP Virtual Escrow and Trade In services" might keep 15% rather than 10% of recovery value and offer a 1 year extended warranty).

On the back end, "HP Virtual Escrow and Trade In services" might decide to outsource a third party service provider to account for the service requirements that Beijing Industries might have during the 1 year, rather than manage the service directly. Manufacturing equipment such as the Robo4000 is highly specialized. Though such offerings might be posted on a general internet portal and bided upon such as Freemarkets.com, this often times will not happen for three main reasons.

First, the burden shifts to Hewlett Packard to go to Freemarkets or other current vertical exchanges and consolidate, ship, and manage the sale of the Robo4000. HP doesn't want to do this because it defocuses HP from their goal of manufacturing printer motherboards at 10,000 units an hour.

Second, Free markets and other vertical exchanges may not have the larger and expanded target bidder community that can be had through the present invention because of the added referrals from Hitachi.

Third, Free markets and other vertical exchanges do not have the ability to "chop up" the Robo4000 nor does it have Hitachi as an expert consultant to help it decide how best to recovery maximize the Robo4000 by breaking it up into parts. Because Hitachi Industries in the best position to know who customers are in this particular market segment, they are in the best position of referring potential bidders and reverse logistics value recapture strategies to an internet exchange bidding portal like "HP Virtual Escrow and Trade In services". Through bidding up against other customers who might be interested in the Robo4000, Beijing Industries ends up paying $24 million for the Robo4000, which Beijing Industries might still find as a good buy.

By splitting the commission structure with Hitachi, additional bidder segments may become identified that previously were very difficult for a general B2B portal to identify and value recapture could better be maximized by leveraging Hitachi's direct domain expertise in finding asset maximization methodologies. Additional bidder segments referred from Hitachi would added to the existing ones connected either directly or virtually into an "HP Virtual Escrow and Trade In services" portal.

Without the present invention, such a methodology and service offering would be virtually impossible for Hitachi Automation to undertake. Hitachi Automation would probably not want to take ownership of the Robo4000 because it is made by another manufacturer, and would potentially confuse its distribution strategy and destabilize the company. Furthermore, because of the limited number of customers for such manufacturing equipment, Hitachi Automation would have previously probably had to assume ownership interest in the old Robo4000. Inventory carrying costs for such equipment is very high, since such equipment requires frequent maintenance and rapidly devalues. Furthermore, Hitachi would have no guarantee of making money from buying up the Robo4000.

The present invention allows Hitachi to better leverage its core competency as a "expert" in the intermediary manufacturing equipment world by offering a "consulting" service, without every taking ownership of the Robo4000! Furthermore, Hitachi's ability to help "HP Virtual Escrow and Trade In services" in finding best value recapture strategy and in building a larger bidder pool at the internet portal in the "connection" of finding the best place for the Robo4000 would allow it to make money without ever taking ownership of the Robo4000! This could dramatically create huge new profitability opportunities for Hitachi.

Lets examine the scenario with the Robo 4000 described in the previous paragraph from Hewlett Packard's perspective. From Hewlett Packard's perspective, $19.2 million for the Robo4000 ($22 million less 10% commission) rather than $5 million as it previously would have recovered before the present invention would result in a supply chain savings of $14.2 million! This savings would translate into allowing Hewlett Packard to manufacturer LaserJet printers for less money because HP's total investment in fixed costs of manufacturing would effectively be reduced by $14.2 million. This would translate into lower costs of LaserJet manufacturing, and would yield lower costs of hi-technology printers for consumers! Ultimately, more people in the world could gain the benefit of computers, the Internet, and printers since owning technology would become cheaper and cheaper!

For example, suppose a "high tech asset" consisted of three components, a microprocessor (A), an LCD screen (B), hard drive (C), and everything else (D). Suppose the values of these components are respectively A, B, C and D. Suppose X is the value of the whole system containing the microprocessor, LCD screen, hard drive, and everything else.

A low touch auction engine is generally utilized by consumers rather than businesses. For this reason, a potential low touch buyer would have interest primarily in X rather than A, B, C, D individually. However, a business in the market of parts may have use for A, B, C, or D or any combination of these components.

For this reason, lets relate the following formula: A+B+C+D=X (the parts A,B,C,D make up the whole which is X). However, the value of A, B, C, D might actually be much more than X. e.g. A might be worth $70, B might be worth $40, C might be worth $25 and D might be worth $15. However, X might be only worth $90 as a whole unit.

By integrating a low touch auction engine in the present invention, the present invention can dynamically increase and decrease a potential "reserve price" for System X made specifically clear in the terms of contract within the scope of the low touch auction engine and its consumer users.

In such a system, if a buyer for A were found at $70 and a buyer for C were found at $25, and a buyer for D were found for $15, the total recovery of the parts before the close of auction could potentially be $110, rather than $90 for the whole X. Therefore, a bidder who initially met reserve at $90 may find that the parts won the auction instead of the whole being sold.

System X buyers often times are not just consumers, but large and medium resellers, dealers, brokers and other such intermediaries.

While the present invention is contemplated as being most useful to virtual sellers who are manufactures of high-technology goods which are subject to rapid depreciation, such as computer hardware, which are supplied to actual sellers who are the manufacturer's strategic account customers for such goods, those skilled in the art recognize that the present invention is equally applicable to all buyers and seller, as well as goods in any industry or field.

In fact, individual and/or networked groups of exchange portals implementing the present invention can be benefit transactions in a variety of products and within a variety of industries, including: microprocessors, medical equipment, manufacturing equipment, telecommunications, defense, general and contract manufacturing, semiconductor, raw material, subcomponent manufacturing, retail and government distribution, pharmaceutical, automotive, software, aerospace, industrial equipment, Application Service Provider, agricultural, food services, retail and commercial land sell/leasing/rental property, financial services, banking, furniture, oil/gas/energy, consulting, legal services, medical services, office equipment and computer hardware.

Also, while one or more embodiments of the present invention have been described, those skilled in the art will recognize that various modifications may be made. Variations upon and modifications to these embodiments are provided by the present invention, which is limited only by the following claims.

What is claimed is:

1. A method for reverse logistics, comprising:
    offering a right to market used goods, owned by an actual seller, for sale over an internet exchange portal, wherein the right to market the used goods is simultaneously provided to a plurality of different virtual sellers over the internet exchange portal;
    selecting at least one of the virtual sellers;
    selling the right to market the used goods to the at least one of the virtual sellers; marketing the used goods over the portal under direction of the at least one virtual seller;
    identifying an actual buyer; and
    selling the used goods to the actual buyer.

2. The method of claim 1, wherein selling the right to market the used goods further comprises the actual seller and the at least one virtual seller entering into a contract.

3. The method of claim 1, wherein the actual seller, the plurality of virtual sellers, and the actual buyer register with the internet exchange portal.

4. The method of claim 1, wherein:
    the at least one virtual seller is a manufacturer of new goods; and
    the actual seller is a strategic account customer of the manufacturer.

5. The method of claim 4, wherein the selling a right step further includes the step of:
    charging the actual seller a lower price for acquiring the new goods in exchange for marketing the used goods.

6. The method of claim 1, wherein the marketing step includes the steps of
    categorizing the used goods; and
    differentiating marketing by category.

7. The method of claim 6, wherein the categorizing step includes the step of:
    categorizing the used goods by their condition.

8. The method of claim 4, wherein the manufacturer offers new goods at a discount to the actual seller for granting the manufacturer the right to market the used goods.

9. The method of claim 4, wherein the manufacturer grants the actual seller credit for granting the manufacturer the right to market the used goods.

10. The method of claim 4, wherein the manufacturer offers the actual seller a rebate for granting the manufacturer the right to market the used goods.

11. The method of claim 6, wherein the categorizing step includes the step of
    categorizing the used goods by functionality levels.

12. The method of claim 11, wherein the functionality levels include systems, devices, components, parts, and materials.

13. The method of claim 6, wherein:
    the marketing step includes the step of virtually differentiating a portion of the used goods into both a first category and a second category;
    the identifying step includes the steps of,
        receiving a first offer for the first category from a first actual buyer; and
        receiving a second offer for the second category from a second actual buyer,
    wherein the second offer is of greater value than the first offer; and
    the selling the used goods step includes the step of selling the portion of used goods to the second actual buyer.

14. The method of claim 6, wherein:
    the marketing step includes the steps of,
        virtually differentiating the used goods into a matrix of categories and
        simultaneously marketing each of category in the matrix; and
    the identifying step includes the step of receiving a set of offers for each of category in the matrix; and
    the selling the used goods step includes the step of accepting those offers which maximize value returned to the actual seller for the used goods.

15. The method of claim 6, wherein the marketing step includes the step of: virtually aggregating the used goods from a first actual seller with other used goods from a second actual sellers into a matrix of categories;
    the identifying step includes the step of receiving a set of offers for each of category in the matrix; and
    the selling the used goods step includes the step of accepting those offers which maximize value returned to the first actual seller.

16. The method of claim 1, further including the steps of
    obtaining credit for a predetermined amount of funds from a creditor on behalf of the actual buyer; and
    delaying payment of the funds from the creditor to the actual seller until after the actual buyer inspects and approves the used goods.

17. A system for reverse logistics, comprising:
    means for offering a right to market used goods, owned by an actual seller, for sale over an internet exchange portal, wherein the right to market the used goods is simultaneously provided to a plurality of different virtual sellers over the internet exchange portal;
    means for selecting at least one of the virtual setters;

means for selling the right to market the used goods to the at least one of the virtual sellers;

means for marketing the used goods over the portal under direction of the at least one virtual seller;

means for identifying an actual buyer; and means for selling the used goods to the actual buyer.

18. The system of claim 17, wherein:

the at least one virtual seller is a manufacturer of new goods; and the actual seller is a strategic account customer of the manufacturer.

19. The system of claim 18, wherein the means for selling a right further includes:

means for charging the actual seller a lower price for acquiring the new goods in exchange for marketing the used goods.

20. The system of claim 17, wherein the means for marketing includes:

means for categorizing the used goods; and means for differentiating marketing by category.

21. The system of claim 20, wherein:

means for marketing includes means for virtually differentiating a portion of the used goods into both a first category and a second category;

means for identifying includes, means for receiving a first offer for the first category from a first actual buyer; and means for receiving a second offer for the second category from a second actual buyer, wherein the second offer is of greater value than the first offer; and means for selling the used goods includes means for selling the portion of used goods to the second actual buyer.

22. The system of claim 20, wherein:

means for marketing includes, means for virtually differentiating the used goods into a matrix of categories; and means for simultaneously marketing each of category in the matrix; and means for identifying includes means for receiving a set of offers for each of category in the matrix; and means for selling the used goods includes means for accepting those offers which maximize value returned to the actual seller for the used goods.

23. The system of claims 20, wherein the means for marketing includes:

means for virtually aggregating the used goods from a first actual seller with other used goods from a second actual sellers into a matrix of categories;

means for identifying includes means for receiving a set of offers for each of category in the matrix; and the means for selling the used goods includes means for accepting those offers which maximize value returned to the first actual seller.

24. The system of claim 17, including:

means for obtaining credit for a predetermined amount of funds from a creditor on behalf of the actual buyer; and means for delaying payment of the funds from the creditor to the actual seller until after the actual buyer inspects and approves the used goods.

* * * * *